United States Patent [19]

Hasegawa et al.

[11] 4,354,750
[45] Oct. 19, 1982

[54] FLASH UNIT HAVING A FLASH OUTPUT CONTROL DEVICE

[75] Inventors: Hiroshi Hasegawa; Osamu Maida, both of Tokyo, Japan

[73] Assignee: Nippon Kogaku K.K., Tokyo, Japan

[21] Appl. No.: 226,012

[22] Filed: Jan. 19, 1981

[30] Foreign Application Priority Data

Feb. 5, 1980 [JP] Japan .................................. 55-12677

[51] Int. Cl.³ ............................................ G03B 15/02
[52] U.S. Cl. ................................... 354/128; 354/60 F; 354/139; 354/145; 354/149
[58] Field of Search ................. 354/33, 127, 128, 139, 354/149, 60 F, 145

[56] References Cited

U.S. PATENT DOCUMENTS 4,122,465 10/1978 Hasegawa et al. .................. 354/128
4,162,836 7/1979 Harrison ............................ 354/139
4,201,463 5/1980 Harigaya et al. ................... 354/149
4,220,407 9/1980 Stemme et al. ..................... 354/289

Primary Examiner—Russell E. Adams
Attorney, Agent, or Firm—Shapiro and Shapiro

[57] ABSTRACT

In a flash unit including a power source portion including a battery and a heavy current consuming source; a flash discharge tube adapted to produce flashlight by the current from the power source portion; flash output control means for metering the reflected flashlight from an object and stopping light emission of the flash discharge tube when a predetermined quantity of light is reached, thereby effecting flash output control operation; and means using the battery as a power source and indicating performance or non-performance of the flash output control operation, there is provided control means for limiting the operation of the heavy current consuming source of the power source portion for a predetermined period during the indication.

5 Claims, 19 Drawing Figures

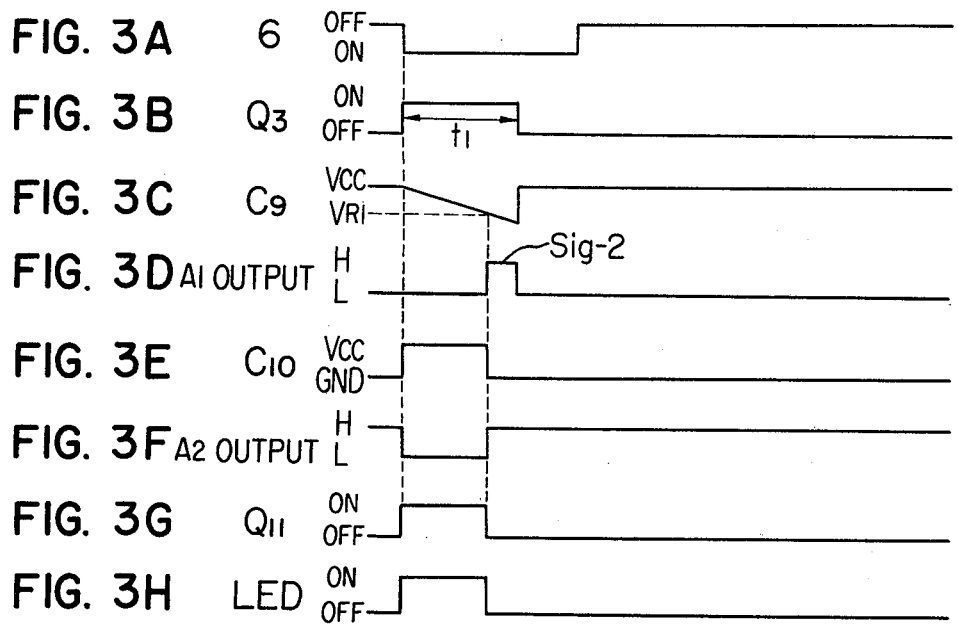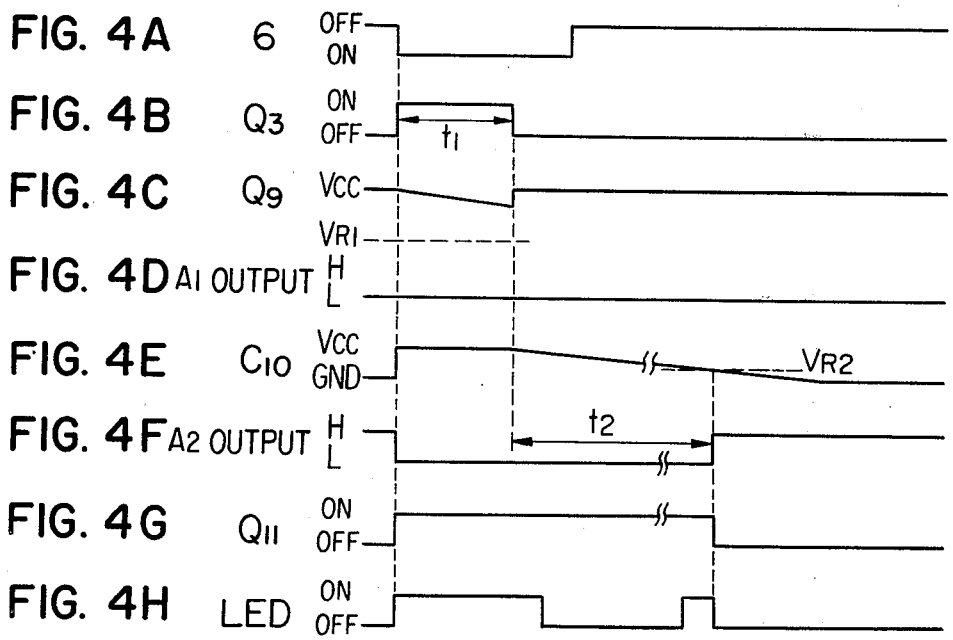

FLASH UNIT HAVING A FLASH OUTPUT CONTROL DEVICE

BACKGROUND OF THE INVENTION

1. Field of the Invention

This invention relates to a flash unit having a flash output control device, and more particularly to a flash unit which is capable of indicating whether or not flash output control operation of the flash output control device has been effected.

2. Description of the Prior Art

Automatic flash output control flash units having a flash output control device which receives and meters the flashlight reflected by an object and which stops light emission of the flash unit, that is, effects flash output control, when the quantity of light received has reached a predetermined quantity, have been widely used in recent years. However, with the automatic flash output control flash units of this type, where the object is very distant, even if the flash unit emits its maximum quantity of light, a predetermined quantity of reflected light may not be obtained and the flash output control device may not operate to effect flash output control operation. In such case, a proper exposure is not obtained and, therefore, there have been proposed various flash output control indication devices which indicate to the photographer whether or not flash output control operation has taken place. These flash output control indication devices are generally of two types. One type is a flash output control non-performance indication device which informs the photographer with the aid of a lamp or a buzzer, that flash output control operation has not been effected. The other type is a flash output control performance indication device which informs the photographer likewise that flash output control operation has been effected. However, these indication devices use the battery of the flash unit as their power source and this gives rise to the following problems.

In the flash output control non-performance indication device, when a flash output control operation has not been effected, the flash unit is emitting its maximum possible quantity of light and a large current is being supplied from the battery to a DC-DC converter for charging the main capacitor of the flash unit. Therefore, the terminal voltage of the battery is decreased due to the internal resistance of the battery, so that the lamp or buzzer of the indication device may become inoperative and warning indication of flash output control non-performance may become impossible. Also, in the flash output control performance indication device, when the flash unit has emitted a quantity of light corresponding to its whole quantity of light emission under flash output control operation, a situation similar to that described above occurs and, indication of flash output control performance becomes impossible.

SUMMARY OF THE INVENTION

It is the object of the present invention to overcome the above-noted disadvantages and to provide a flash unit which effects reliable flash output control indication.

The invention will become fully apparent from the following detailed description thereof taken in conjunction with the accompanying drawings.

BRIEF DESCRIPTION OF THE DRAWINGS

FIGS. 3a–h show signal waveforms in the case of flash output control performance in the operation of the circuit of FIG. 2.

FIGS. 4a–h show signal waveforms in the case of flash output control non-performance in the operation of the circuit of FIG. 2.

DESCRIPTION OF THE PREFERRED EMBODIMENTS

Embodiments of the present invention will hereinafter be described with reference to the drawings.

Figure 1:
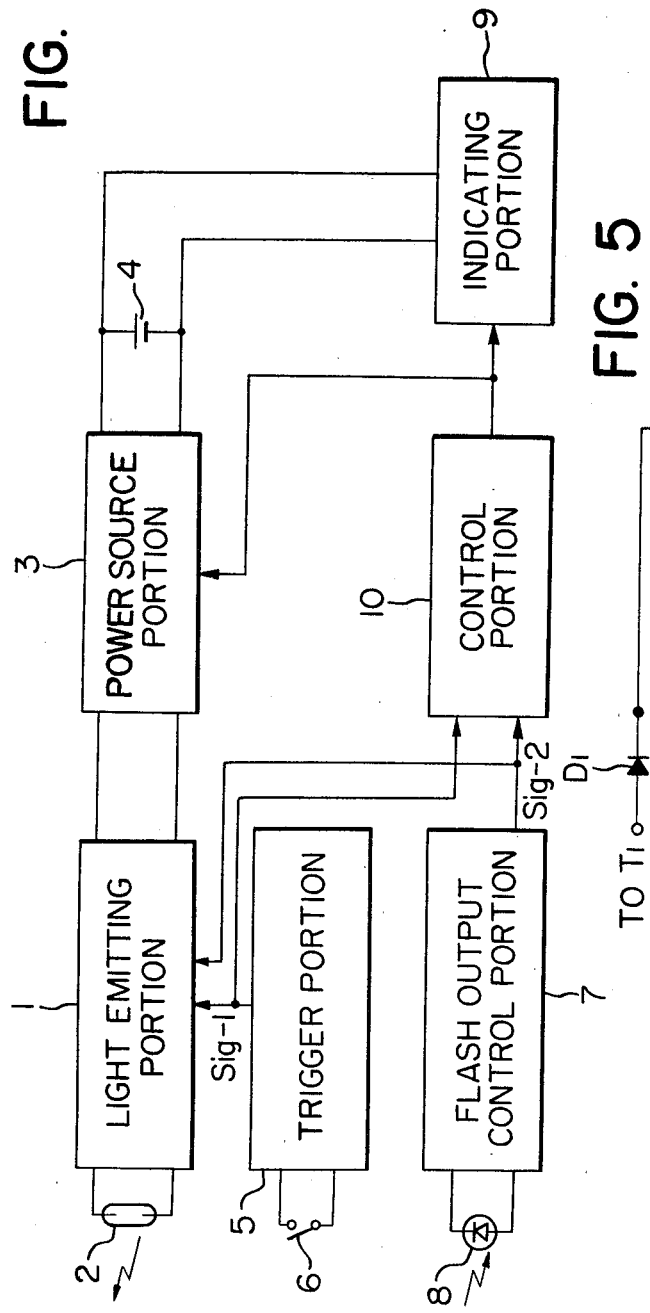
FIG. 1 is a block diagram showing the basic construction of the strobe flash output control indication device according to the present invention.

FIG. 1 shows an embodiment in which the present invention is applied to a flash output control non-performance indication device.

Upon the synchro-switch 6 of a camera being closed, a trigger signal Sig.-1 is generated in a trigger portion 5 and this trigger Sig.-1 is applied to a strobe light emitting portion 1. Upon reception of the trigger signal Sig.-1, the strobe light emitting portion 1 causes a flash discharge tube 2 to emit light with the aid of the current from a power source portion 3 including a battery 4. The discharging current of a main capacitor in the power source portion 3 is used as this current. A flash output control portion 7 includes a photoelectric element 8 which is, for example, a photodiode, that receives flashlight reflected from an object, generates a flash output control signal, namely, a light emission stop signal Sig.-2 when a predetermined quantity of light has been reached, applies this signal to the strobe light emitting portion 1 and stops light emission of the discharge tube 2. The flash output control signal Sig.-2 is not generated when the predetermined quantity of light is not reached. An indicating portion 9 serves to indicate non-performance of flash output control, and it is driven by the battery 4 to turn on a lamp or operate a buzzer, for example, thereby effecting warning a indication when flash output control has not taken place, that is, when the flash output control signal Sig.-2 has not been generated.

A control portion 10, when it has not received the flash output control signal Sig.-2 from the flash output control portion 7 after having received the trigger signal Sig.-1 from the trigger portion 5, controls the power source portion 3 for a predetermined time to suppress the operation of a heavy current consuming source, e.g., a DC-DC converter, within the power source portion 3, and also operates the indicating portion 9 to provide a warning indication to the photographer that flash output control has been impossible. On the other hand, when the flash output control portion 7 has received a predetermined quantity of reflected light, the light emission of the strobe light emitting portion 1 is stopped by the flash output control signal Sig.-2 from the flash output control portion 7. The control portion 10, which receives the flash output control signal Sig.-2, re-enables the heavy current consuming source in the power source portion 3 and disables the indicating portion 9. That is, in accordance with the present invention, during flash output control non-performance, heavy current flow from the battery 4 to the heavy current consuming source in the power source portion 3 is suppressed to enable the warning indication of flash output control non-performance and light metering to be effected reliably.

Where it is desired to apply the present invention to a flash output control performance indicating device, the control portion 10 may be designed such that when it has received the flash output control signal Sig.-2, it suppresses the operation of the power source portion 3 and also drives the indicating portion 9 to effect a flash output control performance indication.

Figure 2:
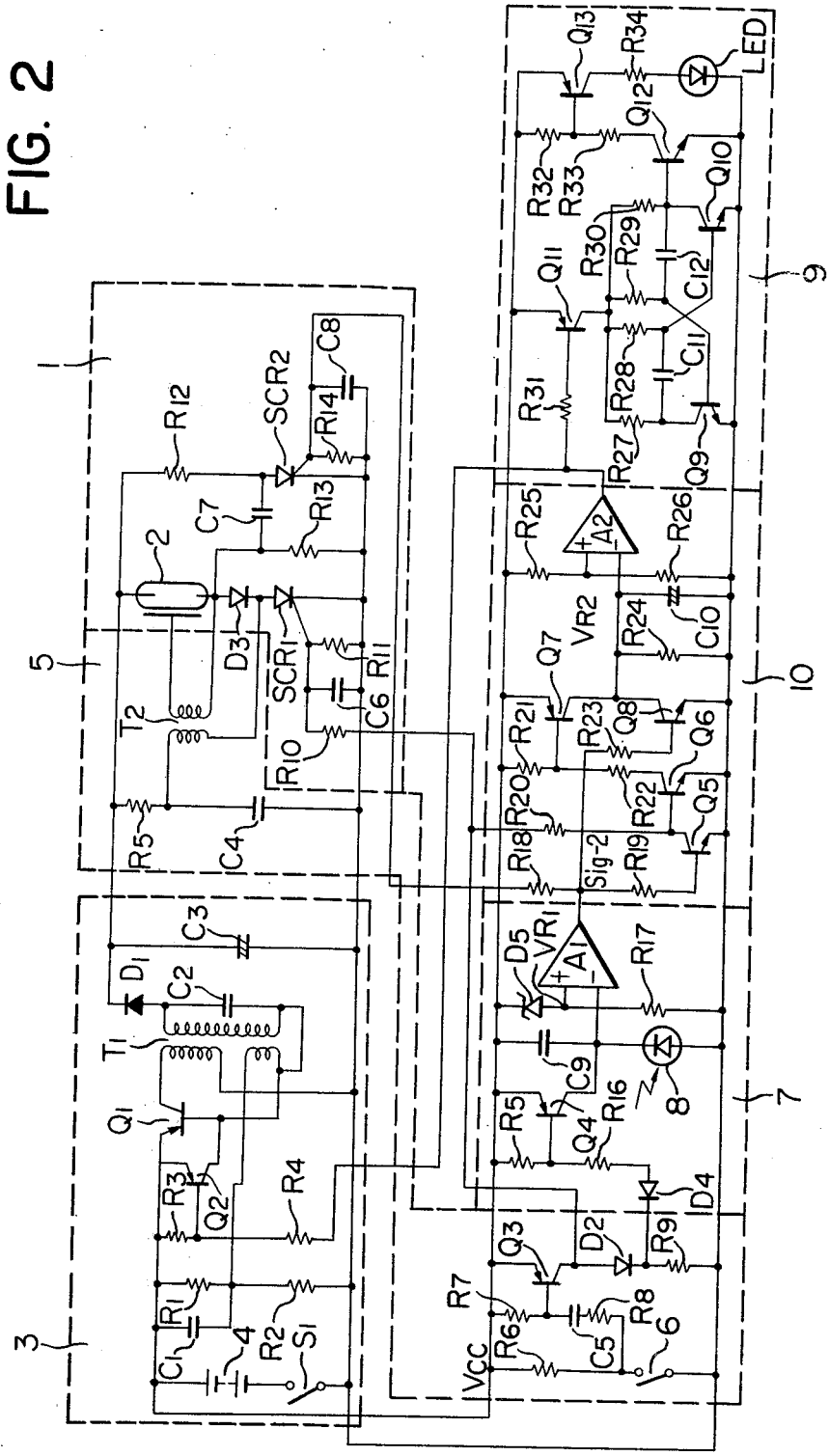
FIG. 2 is a specific circuit diagram of the block diagram of FIG. 1.

FIG. 2 shows a specific example of the circuit for the construction of FIG. 1. A block 3 encircled by a dotted line is the power source portion. A capacitor $C_1$, resistors $R_1$, $R_2$ and a transistor $Q_1$ together constitute an oscillating circuit. This oscillating circuit, a transformer $T_1$, a diode $D_1$ and a capacitor $C_2$ together constitute a DC-DC converter. The output of the DC-DC converter charges a main capacitor $C_3$. That is, the DC-DC converter, when a main switch $S_1$ is closed, boosts the voltage of the battery 4 and charges the main capacitor $C_3$. The DC-DC converter and the main capacitor together constitute the heavy current consuming source.

In the present embodiment, the power source portion 3 also includes an oscillation blocking circuit comprising resistors $R_3$, $R_4$ and a transistor $Q_2$, and this oscillation blocking circuit $R_3$, $R_4$, $Q_2$ inhibits the oscillation of the DC-DC converter in response to a signal applied thereto through the resistor $R_4$. The charging voltage of the main capacitor $C_3$ is supplied to the trigger portion 5 and the strobe light emitting portion 1, and the voltage Vcc of the battery 4 is supplied to the flash output control portion 7, the control portion 10 and the indicating portion 9.

The trigger portion 5 comprises resistors $R_5$–$R_9$, capacitors $C_4$, $C_5$, a transformer $T_2$, a synchro-switch 6, a transistor $Q_3$ and a diode $D_2$. The strobe light emitting portion 1 comprises a flash discharge tube 2, thyristors $SCR_1$, $SCR_2$, resistors $R_{10}$–$R_{14}$, capacitors $C_6$–$C_8$ and a diode $D_3$. The flash output control portion 7 comprises a photodiode 8, resistors $R_{15}$–$R_{17}$, a diode $D_4$, a Zener diode $D_5$, a transistor $Q_4$, a comparator $A_1$ and an integrating capacitor $C_9$. The control portion 10 comprises resistors $R_{18}$–$R_{26}$, transistors $Q_5$–$Q_8$, a capacitor $C_{10}$ and a comparator $A_2$. The indicating portion 9 comprises a multivibrator comprising resistors $R_{27}$–$R_{30}$, transistors $Q_9$, $Q_{10}$ and capacitors $C_{11}$, $C_{12}$, resistors $R_{31}$–$R_{34}$, transistors $Q_{11}$–$Q_{13}$ and a light-emitting diode LED. This light-emitting diode LED is disposed, for example, in the viewfinder optical system of the camera.

The operation of the circuit of FIG. 2 will be described by reference to signal waveforms shown in FIGS. 3A–H and 4A–H. When the main switch $S_1$ is closed, the main capacitor $C_3$, the trigger capacitor $C_4$ and the capacitor $C_7$ are charged by the boosted voltage of the DC-DC converter. When the synchro-switch 6 is closed, namely rendered ON at a point of time shown in FIG. 3A, the transistor $Q_3$ is turned on for a predetermined time period $t_1$ determined by the capacitor $C_5$ and the resistor $R_8$, as shown in FIG. 3B. This period $t_1$ is set so as to be sufficiently longer (for example, several milliseconds) than the longest light emission time of the strobe (typically about one millisecond). When the transistor $Q_3$ has been turned on, the positive voltage of the collector terminal of the transistor $Q_3$ is applied as the trigger signal Sig.-1 to the gate of the thyristor $SCR_1$ of the strobe light emitting portion 1 through the resistor $R_{10}$ to turn on the thyristor $SCR_1$. Thereby, the charge stored in the trigger capacitor $C_4$ flows as a discharging current to the transformer $T_2$ to excite the flash discharge tube 2. As a result, the discharge tube 2 emits light by the discharging current of the main capacitor 3.

The trigger signal Sig.-1 from the collector terminal voltage of the transistor $Q_3$ also turns on the transistors $Q_6$ and $Q_7$ of the control portion 10 and momentarily charges the capacitor $C_{10}$ up to the battery voltage Vcc, as shown in FIG. 3E. At this time, the transistor $Q_8$ is in OFF state because the output of the comparator $A_1$ is at a low level. Since the terminal voltage of the capacitor $C_{10}$ is applied to the inverting input of the comparator $A_2$, the output of the comparator $A_2$ assumes a low level as shown in FIG. 3F. The output of the comparator $A_2$ is applied to the base of the transistor $Q_{11}$ of the indicating portion 9 through a resistor 31 and, when the output of the comparator $A_2$ assumes a low level, the transistor $Q_{11}$ is turned on as shown in FIG. 3G to supply the voltage Vcc to the multivibrator $R_{27}$–$R_{30}$, $C_{11}$, $C_{12}$, $Q_9$, $Q_{10}$ and cause this multivibrator to begin to oscillate at a frequency between several Hz to several tens of Hz. At the same time, this low level output of the comparator $A_2$ turns on the transistor $Q_2$ of the oscillation blocking circuit of the power source portion 3 to render the DC-DC converter $C_1$, $C_2$, $R_1$, $R_2$, $Q_1$, $T_1$, $D_1$ inoperative. Further, conduction of the transistor $Q_3$ of the trigger portion 5 turns off the transistor $Q_4$ of the flash output control portion 7. By the transistor $Q_4$ becoming turned off, the integrating capacitor $C_9$, as shown in FIG. 3C, becomes charged with the photocurrent from the photogiode 8 corresponding to the intensity of the reflected light from an object, thus starting metering. That is, substantially simultaneously with the closing of the synchro-switch 6, the flash discharge tube 2 of the light emitting portion 1 starts to emit light, the multivibrator of the indicating portion 9 starts to oscillate and the flash output control portion 7 starts metering.

(1) The case where flash output control is possible (see FIG. 3).

When there is a sufficient quantity of light impinging on the photodiode 8 and, as shown in FIG. 3C, the charging voltage of the integrating capacitor $C_9$ becomes lower than a reference voltage $VR_1$ generated by the Zener diode $D_5$, the output of the comparator $A_1$ changes from low level to high level as shown in FIG. 3D. This high level signal of the output of the comparator $A_1$ is the flash output control signal Sig.-2, and it is applied to the light emitting portion 1 to stop the light emission of the discharge tube 2 and at the same time, it is also applied to the control portion 10. That is, the flash output control signal Sig.-2 is applied to the gate of the thyristor $SCR_2$ of the light emitting portion 1 to turn on the thyristor $SCR_2$ and to cause the charge stored in the capacitor $C_7$ to be discharged. This discharging current turns off the thyristor $SCR_1$ to stop the light emission of the flash discharge tube 2. Also, the flash output control signal Sig.-2 turns on the transistor $Q_5$ of the control portion 10 to turn off the transistors $Q_6$ and $Q_7$. At the same time, it turns on the transistor $Q_8$ to cause the capacitor $C_{10}$ to be short-circuited and to discharge. Therefore, as shown in FIG. 3E, the terminal voltage of the capacitor $C_{10}$ assumes a low level (GND level) so that the output of the comparator $A_2$ assumes a high level as shown in FIG. 3F. That is, the output of the comparator $A_2$ assumes a low level only during the light emission period of the flash discharge tube 2, and assumes a high level after the light emission has been stopped. When the output of the comparator $A_2$ after completion of the flash output control assumes a high level, the transistor $Q_{11}$ is turned off with a result that the oscillation of the multivibrator of the indicating portion 9 is stopped while, at the same time, the operation of the DC-DC converter of the power source portion 3 is started and the main capacitor $C_3$ is charged with a boosted voltage.

During the time that the output of the comparator $A_2$ is at low level, namely, from the time when light emission is started until it is stopped, the multivibrator $R_{27}$–$R_{30}$, $C_{11}$–$C_{12}$, $Q_9$, $Q_{10}$ oscillates. Whether the transistors $Q_{12}$ and $Q_{13}$ become turned on or off at the start of this oscillation is not primarily determined, but here assuming that the transistors $Q_{12}$ and $Q_{13}$ become turned on, the light-emitting diode LED will be turned on as shown in FIG. 3H. However, since the time during which the comparator $A_2$ is at a low level is 1 ms or less, this turn-on of the light-emitting diode LED will not be sensed by the photographer as an erroneous indication that flash output control was not effected.

(2) The case where flash output control is impossible (See FIG. 4).

The operation when the synchro-switch 6 has been closed is similar to that in the case where flash output control is possible. That is, as soon as the synchro-switch 6 is closed as shown in FIG. 4A, the transistor $Q_3$ is turned on as shown in FIG. 4B to cause the flash discharge tube 2 to emit light and to turn off the transistor $Q_4$ so that, as shown in FIG. 4C, the integrating capacitor $C_9$ begins to be charged with the photocurrent of the photodiode 8 to start metering, and, as shown in FIG. 4E, the capacitor $C_{10}$ of the control portion 10 is immediately charged with the battery voltage $V_{cc}$, so that the output of the comparator $A_2$ assumes a low level as shown in FIG. 4F to turn on the transistor $Q_{11}$ of the indicating portion 9, as shown in FIG. 4G. Conduction of the transistor $Q_{11}$ causes the multivibrator to oscillate to thereby cause the light-emitting diode LED to emit light as shown in FIG. 4H and stops the operation of the DC-DC converter of the power source portion 3.

When the quantity of reflected light from an object is very small, the quantity of light received by the photodiode 8 is small and even if the maximum quantity of light is emitted from the strobe, it is possible that insufficient light is available for a proper exposure. In this event, the charging voltage of the integrating capacitor $C_9$ may not reach the reference voltage $VR_1$, as shown in FIG. 4C, causing the comparator $A_1$ to remain at a low level, as shown in FIG. 4D, so that it does not produce a flash output control signal Sig.-2 having a high level.

During the time period $t_1$ determined by the capacitor $C_5$ and resistor $R_8$ of the trigger portion 5 (the light emission of the flash discharge tube 2 has already been terminated by this time), the transistor $Q_3$ is again turned off as shown in FIG. 4B. Thus, the transistors $Q_6$ and $Q_7$ of the control portion 10 become turned off. The comparator $A_1$ does not produce a flash output control signal Sig.-2 so that the transistor $Q_8$ remains turned off. And therefore, at this time, the charge stored in the capacitor $C_{10}$ begins to be discharged through the resistor $R_{24}$ as shown in FIG. 4E. After a time period $t_2$ determined by the capacitor $C_{10}$ and resistor $R_{24}$ ($t_2$ is selected to a value sufficiently greater than $t_1$, for example, several seconds), the terminal voltage of the capacitor $C_{10}$ becomes lower than the reference voltage $VR_2$ to change, the output of the comparator $A_2$ from low level to high level as shown in FIG. 4F. During the time ($t_1+t_2$) that the output of the comparator $A_2$ is at low level, the transistor $Q_2$ of the oscillation blocking circuit of the power source portion 3 is turned on to turn off the transistor $Q_1$, to thereby inhibit the operation of the DC-DC converter. Thus, in case of non-performance of flash output control, the main capacitor $C_3$ is not immediately charged after the discharging of the main capacitor $C_3$, and for the time $t_2$, the voltage of the battery 4 is in normal condition and can be supplied to the indicating portion 9. During the time that the output of the comparator $A_2$ is at a low level, the transistor $Q_{11}$ of the indicating portion 9 remains turned on and, therefore, the multivibrator continues to oscillate at several to several tens of Hz so that the light-emitting diode LED is turned on and off at that frequency to effect flash output control non-performance indication. In FIG. 4H, in order to clearly show that the light-emitting diode LED is turned on and off, the turn-on-and-off period is depicted as being much smaller than the actual one (several tens of milliseconds to several hundred milliseconds).

After the time $t_2$, the output of the comparator $A_2$ assumes a high level to operate the DC-DC converter of the power source portion 3 again and charge the main capacitor $C_3$, thus becoming ready for the next light emission. Also, the oscillation of the multivibrator is stopped, but at this time the transistor $Q_{12}$ is turned off and so, the transistor $Q_{13}$ is also turned off to turn off the light-emitting diode LED.

Figure 5:
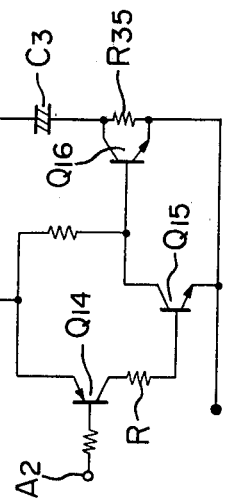
FIG. 5 is a circuit diagram showing a modification of the power source portion in the circuit of FIG. 2.

In the above-described embodiment, during flash output control non-performance indication, the DC-DC converter of the power source portion 3 is completely stopped, but FIG. 5 shows a modification in which, instead, the current consumption by the main capacitor $C_3$ is suppressed to prevent the drop of the terminal voltage of the battery 4.

Parallel connection of a current limiting resistor $R_{35}$ and a bypassing transistor $Q_{16}$ is connected in series with the main capacitor $C_3$ so that the capacitor $C_3$ is charged by a boosted voltage through the parallel connection. The transistor $Q_{16}$ is normally turned on. When flash output control has been impossible, the low level output of the comparator $A_2$ turns on transistors $Q_{14}$ and $Q_{15}$ to turn off the transistor $Q_{15}$ and therefore, the charging of the main capacitor $C_3$ is effected through the current limiting resistor $R_{35}$ to prevent any drop of the battery voltage.

According to the present invention, during flash output control indication, the operation of the heavy current consuming portion of the power source portion is suppressed and, therefore, the non-operation of the flash output control indicating device resulting from the voltage drop of the battery can be prevented.

We claim:
1. A flash apparatus comprising:
a power source portion including a battery and a heavy current consuming source;
means for generating a trigger signal for initiating a flash operation;
a flash discharge tube responsive to said trigger signal and using current from said power source portion for producing light to illuminate an object;
flash output control means for metering the light reflected from the object and for terminating light emission from said flash discharge tube when a predetermined quantity of reflected light is re- ceived, thereby effecting a flash output control operation; and control means responsive to said trigger signal for inhibiting the operation of said heavy current consuming source during said metering.

2. A flash apparatus according to claim 1, wherein said heavy current consuming source includes a DC-DC converter.

3. In a flash apparatus comprising a power source portion including a battery and a heavy current consuming source, means for generating a trigger signal for initiating a flash operation, a flash discharge tube responsive to said trigger signal and using current from said power source portion for producing light to illuminate an object; flash output control means for metering the light reflected from the object and for terminating light emission from said flash discharge tube when a predetermined quantity of light is received, thereby effecting a flash output control operation, and indicating means, using said battery as a power source, for indicating performance or non-performance of said flash output control operation, the improvement comprising:

control means responsive to said trigger signal for inhibiting the operation of said heavy current consuming source during said metering and during said indicating by said indicating means.

4. A flash apparatus according to claim 3, wherein said indicating means indicates non-performance of a flash output control operation, and said control means is responsive to said flash output control means for enabling the operation of said heavy current consuming source upon the occurrence of said flash ouput control operation.

5. A flash apparatus comprising:

a power source portion including a battery and a heavy current consuming source;

means for generating a trigger signal for initiating a flash operation;

a flash discharge tube responsive to said trigger signal and using current from said power source portion for producing light to illuminate an object;

flash output control means for metering the light reflected from the object and for terminating light emission from said flash discharge tube when a predetermined quantity of reflected light is received, thereby effecting a flash output control operation;

indicating means, using said battery as a power source, for indicating the performance or nonperformance of said flash output control operation; and control means responsive to said flash output control means for inhibiting the operation of said heavy current consuming source during said indicating.

* * * * *